UNITED STATES PATENT OFFICE.

JOHN GORDON, OF NEW YORK, N. Y.

PROCESS OF SEPARATING AND EXTRACTING ZIRCONIUM OXID (ZIRCONIA) FROM ORES AND MINERALS.

1,340,888.  Specification of Letters Patent.  Patented May 25, 1920.

No Drawing.  Application filed October 16, 1918. Serial No. 258,351.

*To all whom it may concern:*

Be it known that I, JOHN GORDON, a citizen of the United States, residing at New York, in the county of New York and State of New York, have invented certain new and useful Improvements in Processes of Separating and Extracting Zirconium Oxid (Zirconia) from Ores and Minerals, of which the following is a specification.

My invention relates to the process of separating and extracting zirconium oxid (that is zirconia) from ores and minerals in which it occurs. I have discovered that when ores containing zirconium are fused with a mixture of a chlorid and an oxid that these ores are thereby decomposed, the silica is transferred to the alkali metal or alkaline earth metal forming a silicate, while the zirconium forms partly a zirconate of the same bases and partly remains as simple zirconia.

In carrying out my invention I may use a mixture of an oxid of an alkaline earth metal and a chlorid of an alkaline earth metal, or I may use an oxid of an alkali metal and a chlorid of an alkali metal, or I may use a chlorid of an alkali metal and an oxid of an alkaline earth metal, or a chlorid of an alkaline earth metal and an oxid of an alkali metal.

One mixture which I have found to be very efficient in treating reasonably pure zirconium ore, such for instance as baddleyite consists in taking one part of zirconium ore and adding three to four parts of sodium oxid, or the corresponding amount of carbonate or hydrate and three to four parts of sodium chlorid.

Another mixture consists of one part zirconium ore, three to four parts of calcium oxid or the equivalent quantity of carbonate or hydrate and six to eight parts of calcium chlorid.

Either of these mixtures fuses readily at a temperature of from a thousand to twelve hundred degrees centigrade. After the mixture has been completely fused the temperature should be maintained for a period of from a half an hour to an hour, when the melt may be poured out and allowed to cool. The product thus obtained can be then treated in any desired way. One method of treatment is to pulverize and dissolve in sulfuric acid; when the silica can be separated and filtered out. The zirconia and the other bases in the solution may then be precipitated with ammonia or other alkali. This precipitate can subsequently be purified by any well known or desired method.

The term "oxid" above referred to is intended to include carbonates, hydrates and other compounds which have an effect equivalent to that of the oxid in the reaction indicated.

I intend the term "alkaline element" in the claims to include alkali metals and alkaline earth metals.

What I claim is—

1. The step in the process of producing zirconia which consists in fusing minerals containing zirconium with a mixture of a chlorid and an oxid.

2. The step in the process of producing zirconia which consists in fusing minerals containing zirconium with a mixture of a chlorid of an alkaline element and an oxid of an alkaline element.

3. The step in the process of producing zirconia which consists in fusing minerals containing zirconium with a mixture of sodium chlorid and an oxid.

In testimony whereof I affix my signature in presence of two witnesses.

JOHN GORDON.

Witnesses:
DAVID WOLF,
FRANCIS M. PHELPS.